United States Patent Office 2,752,374
Patented June 26, 1956

2,752,374

PREPARATION OF ACIDS HAVING THIOL GROUPS ON THE ULTIMATE AND ANTEPENULTIMATE CARBONS FROM THE CARBOXYL

Donald S. Acker and Charles W. Todd, Wilmington, Del., assignors to E. I. du Pont de Nemours & Company, Wilmington, Del., a corporation of Delaware No Drawing. Application December 10, 1952,
Serial No. 325,236

3 Claims. (Cl. 260—399)

This invention lies in the field of organic chemistry and relates to the preparation of dimercapto carboxylic compounds and derivatives thereof.

α-Lipoic acid [5(1,2-dithiolane-3-yl)pentanoic acid] is a recently recognized B vitamin involved in the biochemical decarboxylation of α-keto acids and is a growth factor for certain microorganisms. This discovery has stimulated interest in its synthesis, not only to establish its precise structure, but also to provide material for use in determining its nutritional importance in higher animals. Two different methods have been described for synthesizing α-lipoic acid in the laboratory. The first [Bullock et al., J. Am. Chem. Soc. 74, 1868 (1952)] starts with β-furylacrolein and employs the series of reactions schematically represented below:

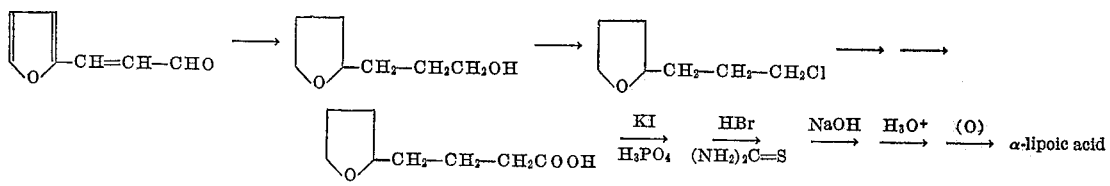

The second method [Bullock et al., J. Am. Chem. Soc. 74, 3455 (1952)] starts with the keto ester obtained by condensing 5-carbethoxy valeroyl chloride with ethylene in the presence of aluminum chloride and employs the series of reactions schematically represented below:

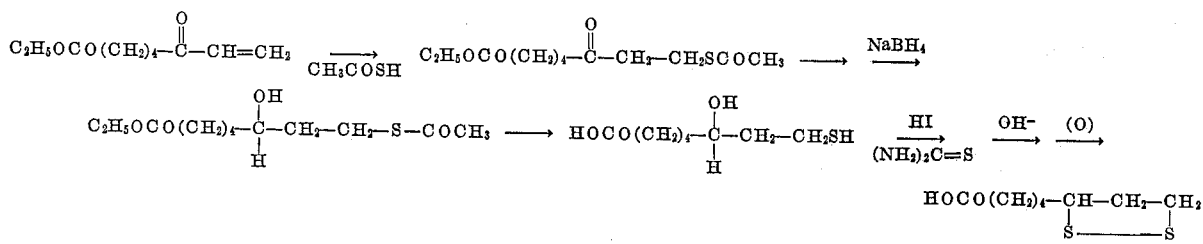

Because of the many steps involved in these syntheses, the yield of desired α-lipoic acid is low.

This invention has as an object the provision of a new process. A further object is the provision of a process for preparing an α-lipoic acid intermediate. Another object is the provision of a process for the preparation of α-lipoic acid. Other objects will appear hereinafter.

These objects are attained by the process of the present invention whereby a compound of the general formula $$YCO—(CH_2)_4—X$$

wherein Y is hydroxyl or a group hydrolyzable to hydroxyl, and X is a three-carbon chain having two of its carbons joined to each other by a plural bond, the third carbon being directly linked thereto by a single bond and having at least two of its remaining valences satisfied by oxygen, sulfur, or nitrogen, no other valence of said carbon being satisfied by oxygen when the plurally bonded atom is oxygen, is reacted with hydrogen and hydrogen sulfide over a hydrogenation catalyst which is active in the presence of sulfur at elevated temperatures and pressure.

The dimercapto monocarboxylic compounds of the formula below are readily oxidized in dilute solution by air or iodine to α-lipoic acid. The process of this invention accordingly provides a route to the growth factor 5-(1,2-dithiolane-3-yl)penthanoic acid, which involves but three steps, namely, a reductive procedure, a hydrolysis, and an oxidation, employs readily available reactants, and requires simple, available equipment.

In preparing 6,8-dimercaptooctanic acid a pressure reactor is charged with the compound YCO—(CH₂)₄—X together with a solvent, e. g., acetic acid, sulfur or other source of hydrogen sulfide, and a hydrogenation catalyst which is active in the presence of sulfur. The reactor is then charged with hydrogen at superatmospheric pressure and agitated and heated to a temperature at which reaction proceeds at a suitable rate, usually in the neighborhood of 140° to 225° C. After reaction is complete, as evidenced by cessation of hydrogen absorption, the reactor is cooled, the product is filtered from the catalyst and blown with an inert gas, e. g., nitrogen, to drive out unreacted hydrogen sulfide. The product is then isolated by the usual methods of distillation or solvent extraction, or may be hydrolyzed with aqueous acid or alkali and oxidized in dilute solution by air or iodine directly to an α-lipoic acid and this may be isolated by crystallization or other methods known to those skilled in the art.

The following examples in which parts are by weight are illustrative of the invention.

EXAMPLE I

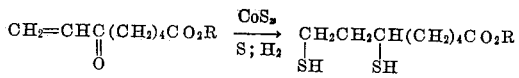

Twenty parts of ethyl 6-keto-7-octenoate, 20 parts of sulfur and 20 parts of acetic acid are charged into a shaking autoclave together with 5 parts (dry basis) of cobalt polysulfide catalyst prepared as in Farlow and Signaigo U. S. 2,402,615. Hydrogen is forced into the autoclave to a pressure of 1000 p. s. i. and the autoclave is heated to a temperature of 150° C. with frequent addition of hydrogen as needed to hold the pressure in the range 1000 to 2500 p. s. i. After 2.5 hours the absorption of hydrogen has become very slow and the temperature is raised and maintained at 175° C., and then to 200° C. until all hydrogen absorption ceases. The total reaction time is about three hours.

The contents of the autoclave are filtered to remove the catalyst and the filtrate diluted with a suitable solvent such as benzene or chloroform to an exact volume. Iodine titration of an aliquot portion shows a mercaptan yield corresponding to the formation of ethyl lipoate [ethyl 5(1,2-dithiolane-3-yl)pentanoate] in 54% of theoretical. Microbiological assay [a modification of the procedure of I. C. Gunsalus et al., J. Biol. Chem. 194, 849 (1952) using dried cells] indicates the presence of a reduced form of lipoic acid in 46% yield. Oxidation in dilute solution with iodine to form the cyclic disulfide and hydrolysis of the ester grouping with aqueous acid or alkali gives DL-α-lipoic acid, DL-[5(1,2-dithiolane-3-yl)pentanoic acid] which was isolated in crystalline form, M. P. 59–60° C.

EXAMPLE II

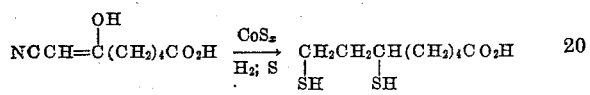

Two and four-tenths parts of 7-cyano-6-hydroxy-6-heptenoic acid, as the keto-enol equilibrium mixture, 2.5 parts of sulfur and 20 parts of acetic acid are charged into a shaking autoclave together with one part cobalt polysulfide catalyst. Hydrogen is forced into the autoclave to a pressure of 1000 p. s. i. and the autoclave is heated to a temperature of 150° C. with frequent addition of hydrogen as needed to hold the pressure in the range 1000–2500 p. s. i. After three hours the absorption of hydrogen has become very slow and the temperature is raised and maintained at 175° C. and then to 200° C. until all hydrogen absorption ceases. The total reaction time is about 3.5 hours.

The contents of the autoclave are filtered to remove the catalyst and the filtrate diluted with a suitable solvent such as chloroform. Microbiological assay as in Example I indicaes the presence of 0.3 part of a reduced form of lipoic acid, 5-(1,2-dithiolane-3-yl)pentanoic acid. This corresponds to a conversion of 10.5%.

EXAMPLE III

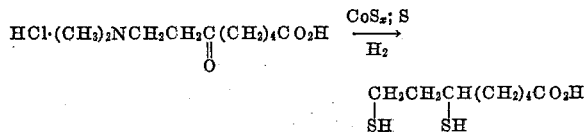

Ten and five-tenths parts of 8-dimethylamino-6-ketooctanoic acid hydrochloride, 10.5 parts of sulfur and 20 parts of glacial acetic acid are charged into a shaking autoclave together with 3 parts of cobalt polysulfide catalyst. Hydrogen is forced into the autoclave to a pressure of 1000 p. s. i. and the autoclave is heated to a temperature of 150° C. with frequent addition of hydrogen as needed to hold the pressure in the range 1000–2500 p. s. i. After three hours the absorption of hydrogen has become very slow and the temperature is raised and maintained at 175° C. and then to 200° C. until all hydrogen absorption ceases. The total reaction time is about 3.5 hours.

The contents of the autoclave are filtered to remove the catalyst and the filtrate diluted with a suitable solvent such as chloroform. Microbiological assay as in Example I indicates the presence of 1.9 parts of a reduced form of lipoic acid, 5-(1,2-dithiolane-3-yl)pentanoic acid. This corresponds to a conversion of 20%.

Example III shows that similar results are obtained using the Mannich base, 8-dimethylamino-6-ketooctanoic acid hydrochloride, in place of the ethyl 6-keto-7-octenoate in Example I, Mannich bases being known precursors of the corresponding unsaturated ketones.

EXAMPLE IV

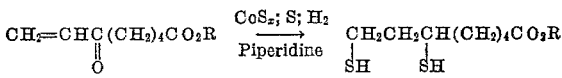

Sixty-four parts of ethyl 6-keto-7-octenoate, 64 parts of sulfur, 60 parts of acetic acid and 1 part of piperidine are charged into a shaking autoclave together with 15 parts of cobalt polysulfide catalyst. Hydrogen is forced into the autoclave to a pressure of 1000 p. s. i. and the autoclave is heated to a temperature of 150° C. with frequent addition of hydrogen as needed to hold the pressure in the range 1000 to 2500 p. s. i. After 2.5 hours the absorption of hydrogen has become very slow and the temperature is raised and maintained at 175° C., and then to 200° C. until all hydrogen absorption ceases. The total reaction time is about three hours.

The contents of the autoclave are filtered to remove the catalyst and the filtrate diluted with a suitable solvent such as benzene. Iodine titration of an aliquot portion shows a mercaptan yield corresponding to the formation of ethyl lipoate, ethyl 5-(1,2-dithiolane-3-yl)pentanoate, in 59% yield. Work-up as in Example I yields crystalline DL-α-lipoic acid, M. P. 60–61° C.

Although the invention has been illustrated with particular reference to ethyl 6-keto-7-octenoate, etc., the invention is applicable to any compound of the general formula $$YCO-(CH_2)_4-X$$

wherein Y is hydroxyl or a group hydrolyzable to hydroxyl, and X is a three-carbon chain having two of its carbons joined to each other by a plural bond, the third carbon being directly linked thereto by a single bond and having at least two of its remaining valences satisfied by oxygen, sulfur, or nitrogen, no other valence of said carbon being satisfied by oxygen when the plurally bonded atom is oxygen. Thus, there can be employed in the process of this invention the illustrative specific $$YCO-(CH_2)_4-X$$

compounds listed in the left column of Table 1 below. When these compounds are used in place of the ethyl 6-keto-7-octenoate in the process of Example I, 6,8-dimercaptooctanoic acid is obtained.

*Table 1*

| Structure and Name of Starting Material | Structure and Name of Product Obtained Upon Reductive Procedure, Hydrolysis and Oxidation |
|---|---|
| HOCO—(CH₂)₄—C=CH—CN<br>    \|<br>    OH<br>7-cyano-6-hydroxy-6-heptenoic acid | HOCO—CH₂—CH₂—CH₂—CH₂—CH—CH₂—CH₂<br>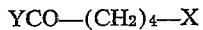<br>5-(1,2-dithiolan-3-yl)pentanoic acid |
| HOOC—(CH₂)₄—C=CH—C=S<br>             ⌊—S—⌋<br>7-carboxy-3-mercapto-2-heptenthionic acid thiolactone | <br>HOOC—(CH₂)₄—CH—CH₂—CH₂<br>5(1,2-dithiolan-3-yl)pentanoic acid |

In place of the carbonyl compounds listed above, it is to be understood that their derivatives which are convertible to carbonyl compounds may be used. Examples are the hemi-acetals, aldimines, ketimines, hydrazones, semi-carbazones, anils, etc.

In hydrogenating preformed thiocarbonyl compounds the conditions employed are the same as for the combined formation and hydrogenation of the thiocarbonyl compounds.

As illustrated above in connection with Example III, Mannich bases can be used in place of the unsaturated ketones in the process of this invention. In place of the Mannich base used therein, other Mannich bases which are known to decompose into the amine and unsaturated compound can be used.

The process of this invention may be carried out over a considerable range of temperatures and pressures. Reaction occurs in many instances at temperatures as low as 100° C. As the temperature is raised the reaction rate increases and in most cases optimum results from the standpoint of reaction rate and yield of desired product are realized at temperatures in the range of 140° C. to 225° C. With compounds which are stable at temperatures above 225° C. it is advantageous to operate at temperatures up to at least 200° C. and thus reduce the time of reaction without sacrifice in yield of desired product.

The reaction proceeds well even at low pressures but in order to insure a practical rate of reaction it is desirable to operate at pressures which are at least 100 p. s. i. (lb./sq. in.). As a rule there is no practical advantage from the use of pressures above 20,000 p. s. i. and this therefore is a practical upper pressure limit.

The use of a solvent is optional. Solvents, however, in addition to providing better contact between the reactants, also aid in heat dissipation and thus in the thermal control of the reaction. Their use therefore constitutes a preferred embodiment. The choice of solvent must be made with due consideration of the particular compound being reductively treated. Suitable media are water, organic acids, alcohols, dioxane and the like.

In the examples sulfur has been used as a source of hydrogen sulfide, as it is especially convenient in generating the desired reactant. However, hydrogen sulfide itself can be used. In place of hydrogen sulfide or sulfur other sulfur compounds that are converted to hydrogen sulfide under the conditions of reaction can be used. Examples are carbon bisulfide, sulfur dioxide, ethyl tetrasulfide, etc. The amount of hydrogen sulfide used can be varied widely. It is usually desirable to employ an excess of hydrogen sulfide over the amount theoretically required and at completion of the reaction vent off the unreacted excess.

The catalysts used are those which are active in the presence of sulfur. These are found in ruthenium and in certain metal sulfides, for example, in the sulfides of such metals as iron, nickel, cobalt, copper, molybdenum, etc. These metal sulfides may be prepared by a variety of methods, for example, by precipitating the metal sulfide from a solution of a metal salt with hydrogen sulfide, a solution of alkali or alkaline earth metal sulfide, or polysulfide, or ammonium sulfide or polysulfide. Another method that has been found to yield very active hydrogenation catalysts is to treat a finely divided pyrophoric or activated metal, suspended in a liquid medium with hydrogen sulfide or sulfur until sulfidation is essentially complete. Alternative methods for preparing these catalysts include heating powdered metals or metal compounds, e. g., oxides, carbonates, or sulfides with volatile sulfiding agents, such as, sulfur, hydrogen sulfide or carbon bisulfide and extraction with sodium polysulfide of the alkali soluble component of alloys of alkali soluble metals with hydrogenating metals, as disclosed and claimed in U. S. Patent 2,402,626.

Instead of charging the metal sulfide catalyst as such into the reactor it may be formed in situ by placing the finely divided pyrophoric or activated metal in the reactor together with the other reactants. The sulfur or hydrogen sulfide present will convert the metal to the active metal sulfide in the early stages of the reaction. The catalyst may be substantially pure metal sulfide or a combination of metal sulfides. Other substances may be present, such as extenders, for example, kielselguhr, alumina, magnesia, etc.

The proportion of catalyst may be varied considerably depending upon the particular catalyst, conditions of operation, etc. In general the amount will range from 0.5 to 30% by weight of the substance being processed. Since good results are obtained using from 2 to 20% by weight of catalyst, this constitutes the proportion most generally used.

This invention constitutes a useful method for preparing 1,3-dimercapto carboxylic compounds which are readily oxidizable to the corresponding 1,2-dithiolane-3-yl derivatives. This process is versatile and simple and therefore constitutes a marked advance over methods previously used for preparing these compounds.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of a compound of the formula

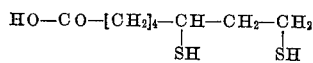

which comprises reacting with hydrogen and hydrogen sulfide at a temperature of 100–225° C. and a superatmospheric pressure of at least 100 p. s. i. in the presence of a hydrogenation catalyst which is active in the presence of sulfur, a compound of the formula

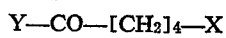

wherein Y is selected from the class consisting of hydroxyl and groups hydrolyzable to hydroxyl and X is a three-carbon chain having a multiple bond between two of the carbons, one of which is joined to the third carbon by a single bond, the third carbon being multiply bonded to an element of the class consisting of oxygen, sulfur, and nitrogen with the proviso that when said carbon is multiply bonded to an oxygen, said oxygen atom is the only oxygen atom attached to said carbon.

2. A process for the preparation of a compound of the formula

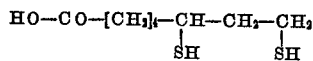

which comprises reacting with hydrogen and hydrogen sulfide at a temperature of 100–225° C. and a superatmospheric pressure of at least 100 p. s. i. in the presence of a hydrogenation catalyst which is active in the presence of sulfur, a lower alkyl 6-keto-7-octenoate.

3. A process for the preparation of a compound of the formula

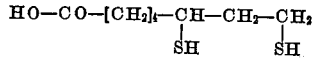

which comprises reacting with hydrogen and hydrogen sulfide at a temperature of 100–225° C. and a superatmospheric pressure of at least 100 p. s. i. in the presence of a hydrogenation catalyst which is active in the presence of sulfur, ethyl 6-keto-7-octenoate.

References Cited in the file of this patent

UNITED STATES PATENTS 2,402,639     Lazier et al.  ----------- June 25, 1946